US009278580B2

(12) United States Patent
Kishizoe et al.

(10) Patent No.: US 9,278,580 B2
(45) Date of Patent: Mar. 8, 2016

(54) PNEUMATIC TIRE AND MOLD

(75) Inventors: Isamu Kishizoe, Kanagawa (JP); Izumi Kuramochi, Tokyo (JP); Kotaro Iwabuchi, Tokyo (JP); Takumi Morito, Tokyo (JP); Koji Watanabe, Kanagawa (JP); Yoshimasa Hashimoto, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 2387 days.

(21) Appl. No.: 11/487,613

(22) Filed: Jul. 17, 2006

(65) Prior Publication Data

US 2007/0089821 A1     Apr. 26, 2007

(51) Int. Cl.
  *B29D 30/06*   (2006.01)
  *B60C 11/11*   (2006.01)
  *B60C 11/12*   (2006.01)
  (Continued)

(52) U.S. Cl.
  CPC ............ *B60C 11/00* (2013.01); *B29D 30/0606* (2013.01); *B60C 11/033* (2013.04); *B60C 11/0318* (2013.04); *B60C 11/11* (2013.01); *B60C 11/12* (2013.01); *B60C 2011/0365* (2013.04); *B60C 2011/1213* (2013.04); *B60C 2011/1254* (2013.04)

(58) Field of Classification Search
  CPC  B29D 30/0606; B60C 11/0318; B60C 11/12; B60C 11/11; B60C 11/033; B60C 11/0306; B60C 2011/0365; B60C 2011/1213
  USPC ....... 152/209.2, 209.18, 209.27, 902, DIG. 3; 425/28.1, 35, 46
  See application file for complete search history.

(56) References Cited

U.S. PATENT DOCUMENTS 5,234,326 A * 8/1993 Galli et al. ................... 425/46
5,766,383 A * 6/1998 Hasegawa et al. ........ 152/209.18
6,575,215 B1 * 6/2003 Hino et al. ................ 152/209.4
(Continued)

FOREIGN PATENT DOCUMENTS

DE     19548733 A1 *  6/1997
GB      2142885      *  1/1985
(Continued)

OTHER PUBLICATIONS

Partial translation of Office Action for Japan Application No. 2005-051277, Feb. 2007.*

(Continued)

*Primary Examiner* — Steven D Maki
(74) *Attorney, Agent, or Firm* — Greer Burns & Crain, Ltd.

(57) ABSTRACT

A pneumatic tire including a first row of blocks arranged in a substantially central region of a tread of the pneumatic tire, wherein the first row of blocks includes a plurality of first blocks; a plurality of first grooves, each arranged between two adjacent first blocks; a plurality of second rows of blocks each including a plurality of second blocks, each arranged on either side of the first row of blocks; a plurality of second grooves, each arranged between the first row of blocks and each of the second rows of blocks; and a plurality of third grooves, wherein each third groove is arranged between two adjacent second blocks, the third grooves including a plurality of fourth grooves and a plurality of fifth grooves, with each fourth groove being narrower than each fifth groove, and the fourth groove and fifth groove being arranged alternately.

27 Claims, 4 Drawing Sheets

(51) Int. Cl.
  *B60C 11/00*   (2006.01)
  *B60C 11/03*   (2006.01)

(56) References Cited

U.S. PATENT DOCUMENTS

| | | | | |
|---|---|---|---|---|
| 6,595,253 | B2 * | 7/2003 | Ikeda | 152/209.18 |
| D529,863 | S * | 10/2006 | Kuramochi et al. | D12/600 |
| 7,506,676 | B2 * | 3/2009 | Ebiko | 152/209.18 |
| 2003/0234065 | A1 * | 12/2003 | Hashimoto et al. | 152/209.2 |

FOREIGN PATENT DOCUMENTS

| | | | |
|---|---|---|---|
| JP | 57-051504 | * | 3/1982 |
| JP | 60-042106 | * | 3/1985 |
| JP | 60-169304 | * | 9/1985 |
| JP | 63-071404 | * | 3/1988 |
| JP | 03-121912 | * | 5/1991 |
| JP | 03-121912 A | * | 5/1991 |
| JP | 03-243403 | * | 10/1991 |
| JP | 04-071909 | * | 3/1992 |
| JP | 04-228308 | * | 8/1992 |
| JP | 06-247110 | * | 9/1994 |
| JP | 07-025210 | * | 1/1995 |
| JP | 08-169212 | * | 7/1996 |
| JP | 09-193616 | * | 7/1997 |
| JP | 11-020413 | * | 1/1999 |
| JP | 2000-094909 | * | 4/2000 |
| JP | 2000-225814 | * | 8/2000 |
| JP | 2001-047818 | * | 2/2001 |
| JP | 2002-307913 | * | 10/2002 |
| JP | 2003-054222 | * | 2/2003 |
| JP | 2003-154527 | * | 5/2003 |
| WO | 2005/005170 | * | 1/2005 |

OTHER PUBLICATIONS

Machine translation for German 19548733 (no date).*
Translation for Japan 04-071909 (no date).*
Translation for Japan 60-169304 (no date).*
Translation for Japan 03-121912 (no date).*
Machine translation for Japan 2000-225814 (no date).*

* cited by examiner

FIG.5

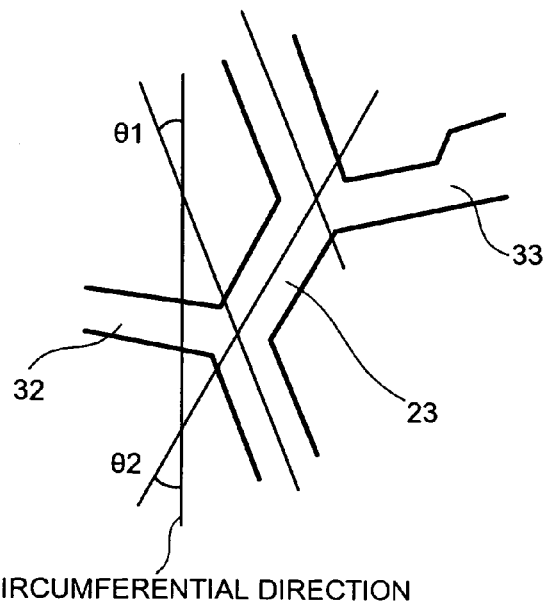

CIRCUMFERENTIAL DIRECTION

FIG.6

|  | CONVENTIONAL TIRE | FIRST TEST TIRE | SECOND TEST TIRE | THIRD TEST TIRE | TIRE OF COMPARATIVE EXAMPLE |
|---|---|---|---|---|---|
| CIRCUMFERENTIAL LENGTH OF CENTER BLOCK | - | THREE TO ONE | THREE TO ONE | ONE TO ONE | ONE TO ONE |
| ANGULAR SUB-GROOVE IN SECOND BLOCK | - | ALTERNATELY NARROW AND WIDE | WIDE ONLY | ALTERNATELY NARROW AND WIDE | WIDE ONLY |
| BRAKING ON ICE | 100 | 110 | 103 | 103 | 100 |
| CORNERING ON ICE | 100 | 107 | 102 | 102 | 100 |
| FEELING ON SNOW | 100 | 107 | 100 | 100 | 100 |

# PNEUMATIC TIRE AND MOLD

BACKGROUND OF THE INVENTION

1. Field of the Invention

The present invention generally relates to a pneumatic tire, and specifically relates to a pneumatic tire for use on ice and snow.

2. Description of the Related Art

Pneumatic tires for use in winter is required to have good performance on both ice and snow. One approach to improve the performance on ice is to make small a ratio of a groove area to a ground contact area of a tire. However, simple reduction in this ratio leads to a decline in performance on snow and in the capacity to prevent hydroplaning. Consequently, it is difficult to have good performance both on ice and snow in one tire.

Japanese Patent Laid-open Publication No. 2000-225814 discloses a conventional pneumatic tire. The conventional pneumatic tire includes a pair of wide first main grooves that runs around the circumference of the tire; a central land parted with the first main grooves in a central region on a tread; a pair of second main grooves that extends on outer sides of the first main grooves in the direction of a tread width to form lateral lands between the first main grooves and the second main grooves; and a plurality of transverse main grooves that opens to the first main grooves via the second main grooves from ends of the tread. The central land includes a series of blocks around which are arranged a plurality of narrow transverse sub-grooves that opens to the first main grooves. Each of the lateral lands includes a circumferential narrow groove that runs around the tire. The lateral land includes a series of outer blocks on the outer side in the direction of the tread width and a series of inner blocks on the central side of the tread on each side of the circumferential narrow groove. Each series of the blocks include sipes. The inner blocks of the lateral land include sipes that are equally angled in a certain direction on each tread, and notched with an angle reverse to the transverse main grooves. The other blocks include sipes that are notched in substantially parallel to the transverse main grooves.

SUMMARY OF THE INVENTION

It is an object of the present invention to at least partially solve the problems in the conventional technology.

According to an aspect of the present invention, a pneumatic tire includes a first row of blocks arranged over an equator of the pneumatic tire on a tread, wherein the first row of blocks includes a plurality of first blocks; a plurality of first grooves, wherein a first groove is arranged between two adjoining first blocks; a plurality of second rows of blocks each including a plurality of second blocks, wherein a second row of blocks is arranged on either side of the first row of blocks, and a first block opposes at least three second blocks; and a plurality of second grooves, wherein a second groove is arranged between the first row of blocks and each of the second row of blocks.

According to another aspect of the present invention, a pneumatic tire includes a first row of blocks arranged in a substantially central region of a tread of the pneumatic tire, wherein the first row of blocks includes a plurality of first blocks; a plurality of first grooves, wherein a first groove is arranged between two adjoining first blocks; a plurality of second rows of blocks each including a plurality of second blocks, wherein a second row of blocks is arranged on either side of the first row of blocks; a plurality of second grooves, wherein a second groove is arranged between the first row of blocks and each of the second row of blocks; and a plurality of third grooves, wherein a third groove is arranged between two adjoining second blocks, the third grooves including a plurality of fourth grooves and a plurality of fifth grooves, a fourth groove being narrower than a fifth groove, and a fourth groove and a fifth groove being arranged alternately along a circumference of the pneumatic tire.

According to still another aspect of the present invention, a mold is used to fabricate the above pneumatic tire.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3A to 3C, 4, and 5 are plan views of variants of the pneumatic tire shown in FIG. 1; and FIG. 6 is a table of a result of a performance test.

DETAILED DESCRIPTION OF THE PREFERRED EMBODIMENTS

Exemplary embodiments of the present invention will be explained below in detail with reference to accompanying drawings. The present invention is not limited to the embodiments. The embodiments include components that a person skilled in the art can easily replace or components that are substantially similar to the components described in the embodiments. Variants described in the embodiments can be combined into any combination within a scope obvious to a person skilled in the art.

Figure 1:
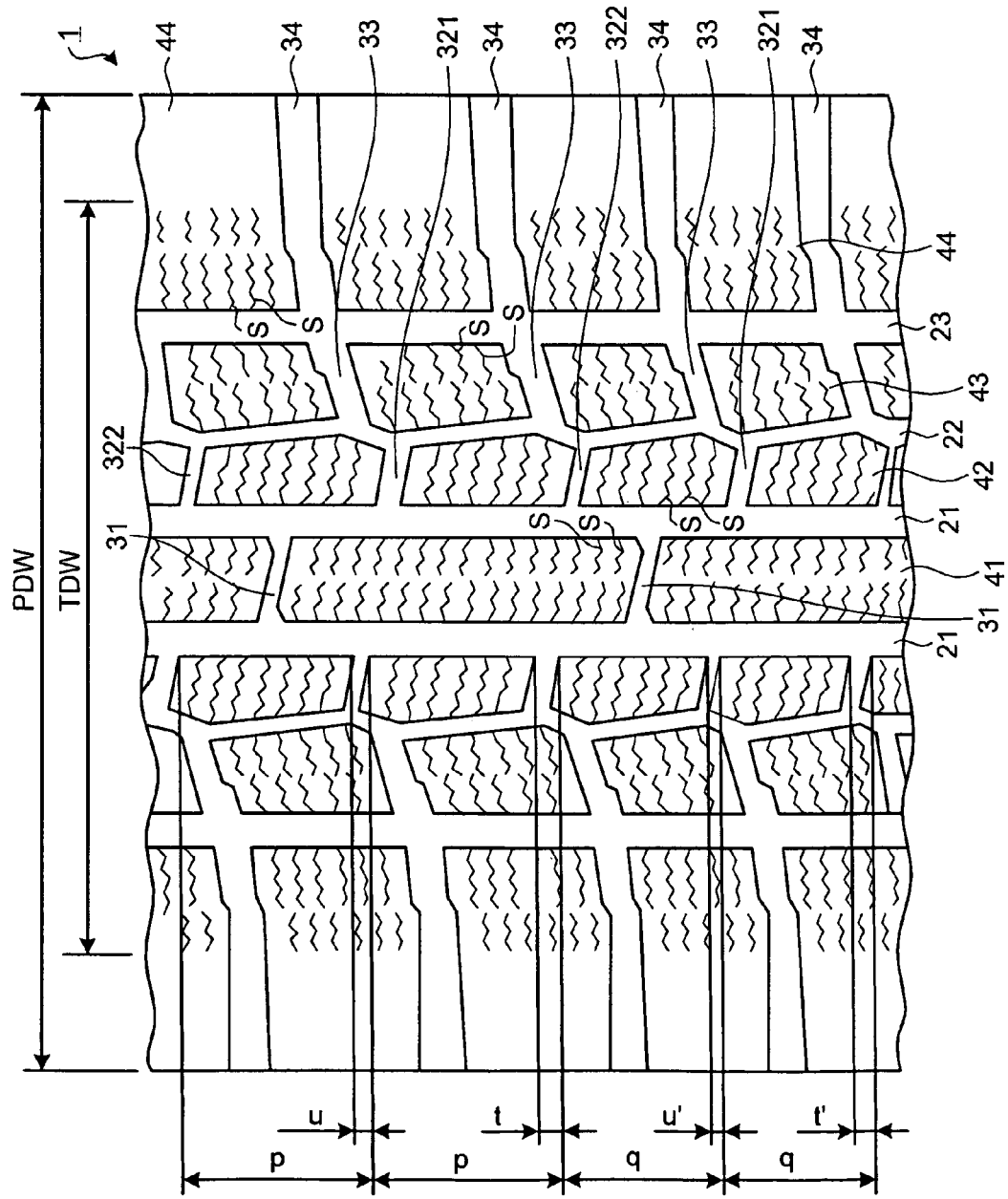
FIG. 1 is a plan view of a tread on a pneumatic tire according to an embodiment of the present invention.
Figure 2:
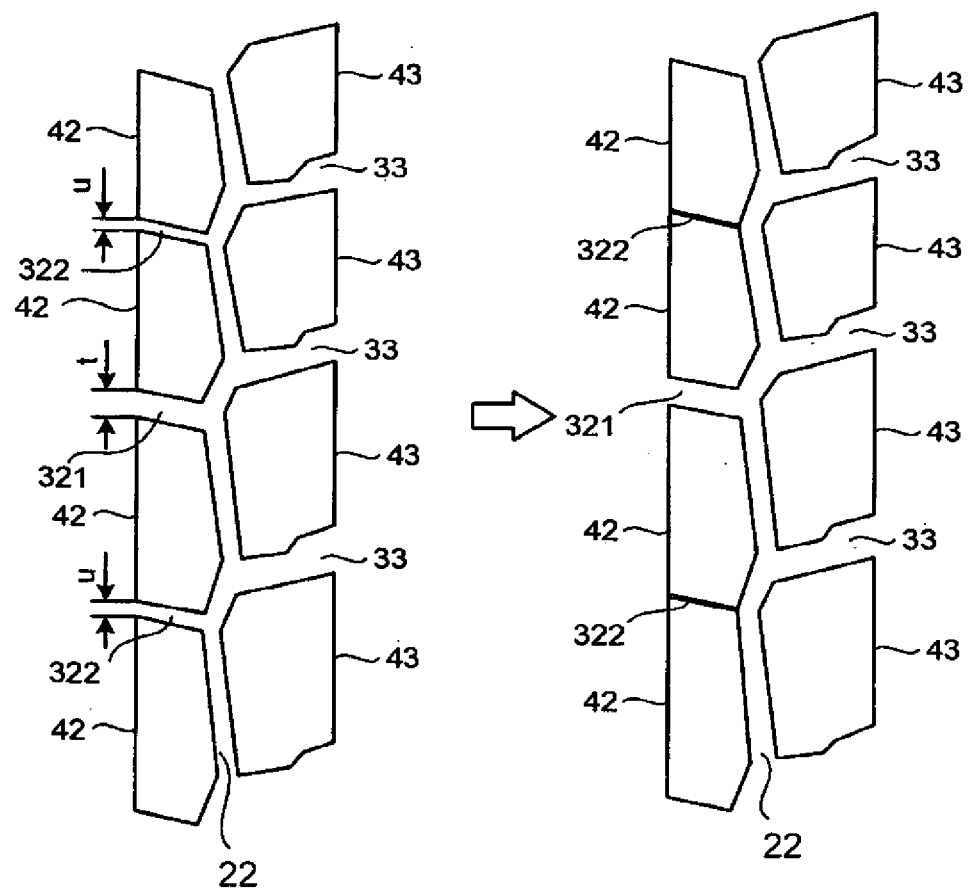
FIG. 2 is a schematic for explaining an action of the pneumatic tire shown in FIG. 1.
Figure 3A:
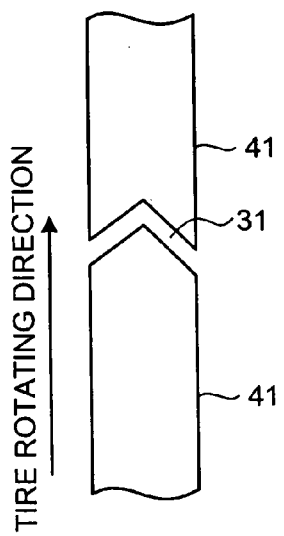
Figure 3B:
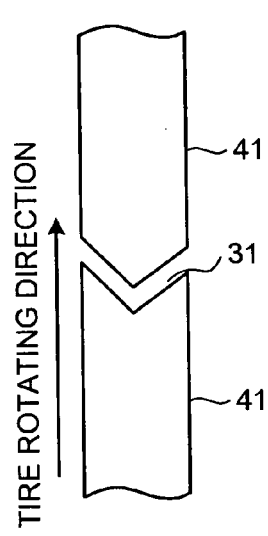
Figure 3C:
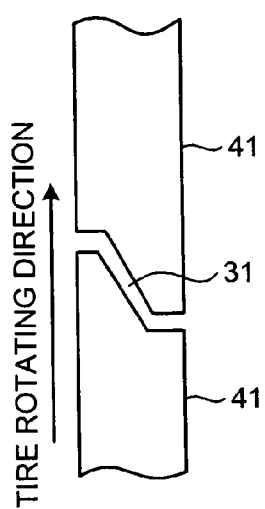
Figure 4:
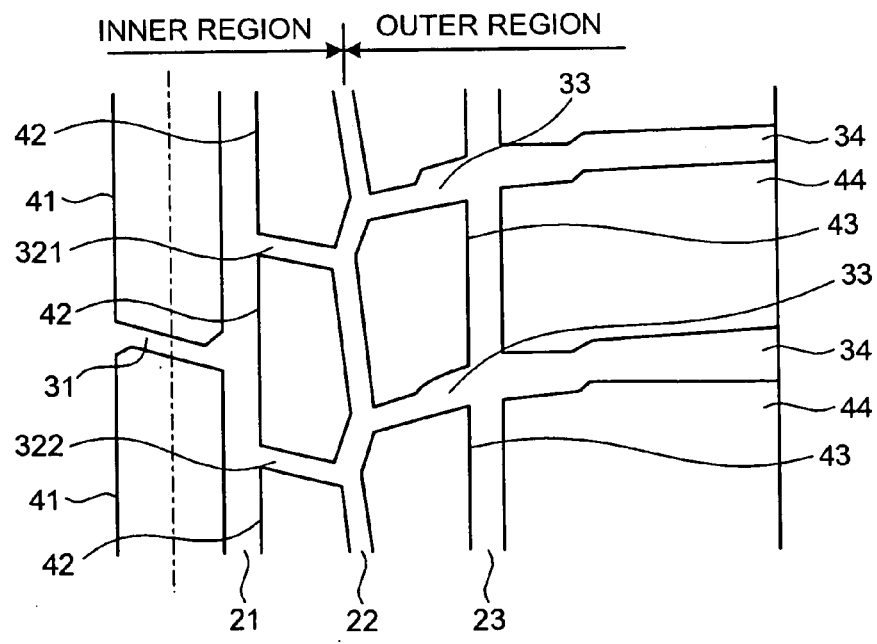

FIG. 1 is a plan view of a tread on a pneumatic tire 1 according to an embodiment of the present invention. FIG. 2 is a schematic for explaining an action of the pneumatic tire 1 shown in FIG. 1. FIGS. 3A to 3C, 4, and 5 are variants of the pneumatic tire 1 shown in FIG. 1. FIG. 6 is a table of a result of a performance test.

In FIG. 1, PDW denotes the overall width of the tire (hereinafter, "tire width"), and TDW denotes the width of the tire that makes a contact with the ground, snow, or ice (hereinafter, "ground contact width"). The pneumatic tire 1 includes center blocks 41 and second blocks 42 (see FIG. 1). The center blocks 41 are arranged on the substantially center of the tread, i.e., over the equator of the tire. The second blocks 42 are arranged on either sides of the center blocks 41 in the direction of a tire width. The center blocks 41 and the second blocks 42 are parted with first longitudinal grooves (main grooves) 21 that extend along the circumference of the pneumatic tire 1.

A pair of first longitudinal grooves 21 is formed on the both sides of the equator of the tire on the tread on the pneumatic tire 1, and the center blocks 41 are arranged between the first longitudinal grooves 21. Adjoining center blocks 41 are parted with a first transverse groove (narrow groove) 31 that extends in the direction of the tire width. Second longitudinal grooves 22 that extend circumferentially are formed on outer sides of the first longitudinal grooves 21 in the direction of the tire width. The second blocks 42 are parted with the second longitudinal grooves at the outer sides in the direction of the tire width. Adjoining second blocks 42 are parted with second transverse grooves (angular sub-grooves) 321, 322, which extend in the direction of the tire width.

Third longitudinal grooves (circumferential main grooves) 23 that extend circumferentially are formed on the outer sides of the second longitudinal grooves 22 in the direction of the tire width, and third blocks 43 are arranged between the third longitudinal grooves 23 and the second longitudinal grooves 22. Adjoining third blocks 43, 43 are parted with a ragged groove 33 that extends in the direction of the tire width. Additionally, shoulder blocks 44 are arranged on further outer sides of the third longitudinal groove 23 in the direction of the tire width. Adjoining shoulder blocks 44 are parted with a ragged groove 34 that extends in the direction of the tire width.

FIG. 1 depicts a tread pattern that is symmetrical with respect to a point on the equator of the tire, however, the tread pattern can be formed symmetrically with respect to the equator (a directional pattern).

Each of the center blocks 41 opposes at least three second blocks 42. Precisely, each of the center blocks 41 has such a length that it opposes at least three second blocks 42.

Due to such a configuration, a groove area in the center region of the tread is smaller than a groove area as compared to a case where the lengths of a center block and a second block are substantially equal. As a result, sufficient block rigidity and a ground contact area in the center region can be obtained, so that braking and cornering performances on an iced road surface are improved.

The second transverse grooves 321 have wider groove widths t and t', and the second transverse grooves 322 have narrower groove widths u and u'. The second transverse grooves 321 and the second transverse grooves 322 are alternately arranged in the circumferential direction. The adjoining second blocks 42, 42 are circumferentially parted with the second transverse grooves 321, 322. The groove widths u and u' of the second transverse grooves 322 is such that some of the second transverse grooves 322 "close" when the second blocks 42 get deformed due to pressure as a result of contact of the pneumatic tire 1 with the ground. Some of the second transverse grooves 321, 322, for example, which are situated on a separating position in a separated mold for tire etc., can have different width than t or u.

The left part in FIG. 2 depicts the pneumatic tire 1 that is not in contact with the ground and the right part depicts the pneumatic tire 1 that is in contact with the ground. When pressure is applied to the second blocks 42 due to contact with the ground, the narrower second transverse grooves 322 get "closed", i.e., the second blocks 42 on either sides of the narrower second transverse grooves 322 touch and support each other. Because the second blocks 42 on either sides of the narrower second transverse grooves 322 support each other, they do not collapse much due to the contact with the ground, so that the rigidity of the tire is enhanced, thereby improving braking and cornering performances on an iced road surface.

In contrast, the wider second transverse grooves 321 are open even when the tire is in contain with the ground, and those open grooves function as a drain. Accordingly, drainage is ensured when the tire is in contact with the ground, thereby ensuring a performance against hydroplaning.

Variant 1

It is preferable that the width of the center block 41 is between 5% and 20% of a half of the ground contact width (half TDW). Due to such a configuration, block rigidity that is applied on the center block 41 in the direction of tire width is ensured, thereby maintaining the cornering on an iced road surface. In addition, rigidity difference between the center blocks 41 and the second blocks 42 is appropriately modified, thereby reducing centre wearing.

"Half TDW" is the dimension of a ground contact area in the direction of the tire width, when a pneumatic tire is rimed into a proper rim and the pneumatic tire is applied with a proper inner pressure and a proper load. "Proper rim" refers to "standard rim" defined by Japan Automobile Tire Manufacturers Association (JATMA), "design rim" defined by Tire and Rim Association (TRA), or "measuring rim" defined by European Tire and Rim Technical Organization (ETRTO). "Proper inner pressure" refers to "maximum tire inflation pressure" defined by JATMA, a maximum value of "tire load limits at various cold inflation pressures" defined by TRA, or "inflation pressure" defined by ETRTO. "Proper load" refers to "maximum load capacity" defined by JATMA, a maximum value of "tire load limits at various cold inflation pressures" defined by TRA, or a "load capacity" defined by ETRTO. In a case of a tire for a passenger vehicle, the proper inner pressure is an inflation pressure at 180 kPa, and the proper load is at 88% of the maximum load capacity.

Variant 2

It is preferable that the first transverse groove 31 in the center blocks 41 has a substantial V-shape, a substantial U-shape, a substantial S-shape, a substantial Z-shape, or another bent shape. For example, when the first transverse groove 31 has a substantial V-shape and a top of its bent part is oriented toward a rotating direction of the tire (see FIG. 3A), drainage of the tire is improved compared with when the first transverse groove 31 has a straight shape. In contrast, when the top of the bent part of the first transverse groove 31 is oriented opposite to the rotating direction of the tire (see FIG. 3B), the braking of the tire is improved. When the first transverse groove 31 has a substantial S-shape or a substantial Z-shape ((see FIG. 3C), the cornering of the tire is improved. Therefore, according to a tire specification, a favorable tire performance can be obtained.

Variant 3

It is preferable that the second blocks 42 have different pitch lengths (pitch variation). For example, a pitch variation of the second blocks 42 is configured based on a unit pattern in the order of a long pitch p, a long pitch p, a short pitch q, and a short pitch q (see FIG. 1). This results in effectively reducing a vibration noise when the tire is vibrating due to block patterns.

Variant 4

It is preferable that the widths u and u' are between 5% and 10% of the pitch lengths p, q. Accordingly, when grounding the tire, the narrower second transverse groove 322 is closed successfully, so that collapse of the second blocks 42 is reduced, thereby improving the braking and the cornering on an iced road surface.

On the other hand, it is preferable that the widths t and t' are between 10% and 20% of the pitch lengths p, q. Accordingly, the width of the second transverse grooves 321 when the tire is in contact with the ground is ensured to maintain a favorable drainage.

The pitch lengths mean the pitch lengths p, q of the second blocks 42, to which the second transverse grooves 321, 322 belong. To which of the adjoining second blocks 42 the second transverse grooves 321, 322 belong is defined per series of blocks based on the circumferential direction.

Variant 5

It is preferable that the second transverse grooves 321, 322 are inclined to the direction of the tire width (see FIG. 1). Due to such a configuration, edge force by the second blocks 42 in the direction of the tire width when the tire is in contact with the ground increases. This improves the cornering and traction on an iced road surface.

Variant 6

It is preferable that each of the second longitudinal grooves 22 is located between 25% and 50% of the half TDW from the equator of the tire. Precisely, the center blocks 41 and the second blocks 42 are preferably positioned within a range between 25% and 50% of the half TDW from the equator (an inner region of the ground contact area), and the third blocks 43 that include the ragged groove 33 are positioned on an outer region of the ground contact area (see FIG. 4).

In the inner region of the ground contact area, the center blocks 41 and the second blocks 42 are formed to contribute improvement in a performance on ice. In the outer region of the ground contact area, the third blocks 43 are formed to contribute improvement in a performance on snow. Due to such a configuration, a boundary between the inner region and the outer region is appropriately modified, thereby optimizing the balance between the performance on ice and the performance on snow.

Variant 7

It is preferable that the second longitudinal grooves 22 extend circumferentially in zigzag. Due to such a configuration, an amount of edging action by the second blocks 42 and the third blocks 43 in the direction of the tire width when grounding the tire increases. This improves the cornering on snow and the traction performance.

Moreover, it is preferable that angles $\theta 1$, $\theta 2$ between the second longitudinal grooves 22 and the circumferential direction of the tire are between 5 degree and 30 degree (see FIG. 5). Furthermore, because sizes of the second blocks 42 are within a predetermined range, rigidity of each of the second blocks 42 is substantially uniformized to maintain a driving performance on a dry road surface.

Variant 8

It is preferable that the second longitudinal groove 22 has a groove width substantially equal to the groove width of the first longitudinal groove 21 or the third longitudinal groove 23. Specifically, to maintain drainage when grounding the tire with a wide tread area, the width of the third longitudinal groove 23 is widened. This results in maintaining a good performance against hydroplaning on a wet road surface.

Variant 9

It is preferable that the ragged groove 33 in the third blocks 43 communicates with the second longitudinal grooves (see FIG. 1). This improves cornering performance on an iced road surface.

Moreover, an end of the ragged groove 33 in the third blocks 43 is preferably positioned within a range between 25% and 50% of the half TDW from the equator of the tire. This results in better performances on ice and snow.

Variant 10

As shown in FIG. 1, sipes S are formed on the second blocks 42 and the third blocks 43 (or on the shoulder blocks 44). It is preferable that the density of the sipes in the second blocks 42 is higher than that in the third blocks 43. This results in uniformizing the block rigidity between the second blocks 42 and the third blocks 43 (or the shoulder blocks 44), thereby reducing biased wear on the tread.

Variant 11

It is preferable that the ratio of the groove area to the ground contact area is between 25% and 40%, and more preferably between 23% and 35%. This ensures to obtain the block rigidity and the actual ground contact area more favorably, thereby further improving braking and cornering performances on an iced road surface.

Variant 12

It is preferable that the hardness of the rubber material that constitutes the tread is between 40 and 55 of hardness A (at 0 degree Celsius) according to Japanese Industrial Standards (JIS-hardness A). Because JIS-hardness A of the rubber material is equal to 40 or higher, collapse of the second blocks 42 when grounding the tire is reduced so that the block rigidity is enhanced. Because JIS-hardness A of the rubber material is equal to 55 or lower, a sufficient grounding friction force is obtained on an iced road surface. Therefore, the performance on ice and the same on snow are improved.

The pneumatic tire 1 can be molded in a mold for tire that has a tread molding surface that can form the tread pattern shown in FIG. 1. The mold for tire can be easily designed by using the tread pattern of the pneumatic tire 1 in reverse.

In a process of producing a pneumatic tire, a green tire (raw tire) is molded by a molding machine (not shown) using members such as a carcass, a belt, a tread, and a bead. Next, the green tire is filled into a tire vulcanizing mold (not shown). The vulcanizing mold is then heated, as well as the green tire is expanded radially outward by a pressurizing device (not shown) to touch the mold (a tread-surface molding part) of the tire vulcanizing mold. Next, the green tire is heated to associate rubber molecules and sulfur molecules in the tread so that vulcanization takes place. The pattern of the mold for tire is transferred onto a tread surface of the green tire to form the tread pattern of the pneumatic tire 1. A molded pneumatic tire is then withdrawn from the tire vulcanizing mold.

Several kinds of pneumatic tires were tested at different conditions for checking the performances of the tires. The conditions include: (1) braking on an iced road surface (braking on ice test), (2) cornering on an iced road surface (cornering on ice test), and (3) feeling on a snowed road surface (feeling on snow test) (see FIG. 6). The pneumatic tires that were tested had a tire size of 195/65R15 91Q, were rimed into a rim with a size of 15×6.5JJ, and inflated with 200 kPa of inflation pressure. Those pneumatic tires were then fitted to a test vehicle of Japanese make that had a displacement of 2000 cc and a front-engine rear-wheel drive.

In the braking on ice test (1), the test vehicle was driven on a test course, and brakes were applied when the speed of the test vehicle was 40 km/h to measure the breaking distance. Indices were calculated for the measured breaking distances were evaluated by taking the value of conventional pneumatic tires as a reference value (100). The larger the index is, the better the tire is.

In the cornering on ice test (2) and the feeling on snow test (3), the test vehicle was driven on a test course with pressed snow, and sensory evaluation was conducted for braking, startability, and straight line stability by a test driver. Sensory evaluation is conducted as a value of conventional tires is referred to a reference value (100). The larger the value of the sensory evaluation is, the better the tire is.

Similar tests were performed with conventional tires. In the conventional tires, one center block opposes one second block ("one to one" in FIG. 6), i.e., the center block and the second block have substantially equal lengths. Moreover, in the conventional tires, the second blocks and the third blocks are integrated, i.e., there is no groove between the second blocks and the third blocks.

Tires of a comparative example were tested. In the tires of the comparative example, one center block opposes one second block, moreover, all of the second transverse grooves in the second blocks were wide.

In a first test tire, one center block 41 opposes three second blocks 42 ("three to one" in FIG. 6), and the wider second transverse grooves 321 and the narrower second transverse grooves 322 are alternately arranged (see FIG. 1). In the second test tire, one center block 41 opposes three second blocks 42 ("three to one" in FIG. 6), and all of the wider second transverse grooves 321 are wide in width. In the third test tire, one center block 41 opposes one second block 42 ("one to one" in FIG. 6), and the wider second transverse grooves 321 and the narrower second transverse grooves 322 are alternately arranged.

In the first to third test tires, the longitudinal grooves 21 to 23 has a groove width equal to 2 millimeters or more. The second blocks 42 are configured with four patterns of unit arrangement: (1) the pitch length p is approximately 40 millimeters, and the second groove width u is 0.075×p (narrower width), (2) the pitch length p is approximately 40 millimeters, and the second groove width t is 0.13×p (wider width), (3) the pitch length q is approximately 30 millimeters, and the second groove width u' is 0.075×q (narrow width), and (4) the pitch length p is approximately 30 millimeters, and the second groove width t' is 0.13×p (wide width).

As can be seen from FIG. 6, in the first to third test tires, the values corresponding to any of (1) the braking on ice test, (2) the cornering on ice test, and (3) the feeling on snow test is better than the conventional tire and the tire of the comparative example. Particularly, the first test tire is superior.

In this manner, the pneumatic tire according to the embodiments of the present invention can be suitably used on ice and snow.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pneumatic tire comprising:
a first row of blocks arranged in a substantially central region of a tread of the pneumatic tire, wherein the first row of blocks includes a plurality of first blocks;
a plurality of first grooves, wherein each said first groove is arranged between two adjacent first blocks;
a plurality of second rows of blocks each including a plurality of second blocks, wherein each said second row of blocks is arranged on either side of the first row of blocks;
a plurality of second grooves, wherein each said second groove is arranged between the first row of blocks and each of the second rows of blocks;
a plurality of third grooves, wherein each said third groove is arranged between two adjacent second blocks, the third grooves including a plurality of fourth grooves and a plurality of fifth grooves, with each said fourth groove being narrower than each said fifth groove, and said fourth groove and said fifth groove being arranged alternately along a circumference of the pneumatic tire;
a plurality of third rows of blocks, each including a plurality of third blocks, wherein each said third row of blocks is arranged on an outer side of the second row of blocks in the direction of the width of the pneumatic tire;
a plurality of sixth grooves, wherein each of said sixth grooves is arranged between two adjacent third blocks, wherein each of said sixth grooves is a ragged groove; and
a seventh groove, wherein said seventh groove is arranged between one of the second rows of blocks and one of the third row of blocks, wherein the seventh groove has a zig-zag shape,
wherein the fourth grooves, the fifth grooves and the sixth grooves are open at bending points of the zig-zag shape of the seventh groove,
wherein each of the second rows of blocks and each of the third rows of blocks are arranged on an inner side, with respect to the tire width direction, of an outermost main groove,
wherein adjacent ones of the fourth and fifth grooves extend in the same direction,
wherein a first block opposes at least three second blocks,
wherein an edge portion of one of said first blocks, on a second groove side thereof, opposes edge portions of at least three of said second blocks, on second groove sides thereof, and
wherein openings of an adjacent pair of the first grooves, on the second groove side thereof, are arranged offset to openings of an adjacent pair of the fourth groove and the fifth groove, on the second groove side thereof, in the tire circumferential direction.

2. The pneumatic tire according to claim 1, wherein a width of the first block is between 5% and 20% of a half of a ground contact width of the pneumatic tire.

3. The pneumatic tire according to claim 1, wherein the first groove has a bent shape.

4. The pneumatic tire according to claim 1, wherein the second blocks are arranged at different pitches along an equator.

5. The pneumatic tire according to claim 1, wherein a width of the fourth groove is between 5% and 10% of a pitch of a corresponding second block.

6. The pneumatic tire according to claim 1, wherein a width of the fifth groove is between 10% and 20% of a pitch of a corresponding second block.

7. The pneumatic tire according to claim 1, wherein the third groove makes an angle with respect to a direction of a width of the pneumatic tire.

8. The pneumatic tire according to claim 1, wherein:
the seventh groove is located between 25% and 50% of a half of the ground contact width from the equator.

9. The pneumatic tire according to claim 8, wherein each segment of the seventh groove makes an angle of 5 degrees to 30 degrees with respect to the circumference of the pneumatic tire.

10. The pneumatic tire according to claim 8, wherein a width of the seventh groove is substantially equal to a width of the second groove.

11. The pneumatic tire according to claim 8, wherein the sixth groove is connected to the seventh groove.

12. The pneumatic tire according to claim 8, wherein an inner end of the sixth groove with respect to the direction of the width of the pneumatic tire is located between 25% and 50% of a half of the ground contact width from the equator.

13. The pneumatic tire according to claim 8, further comprising a plurality of sipes in the second block and the third block, wherein a density of the sipes in the second block is higher than that in the third block.

14. The pneumatic tire according to claim 1, wherein a ratio of a groove area to a ground contact area of the pneumatic tire is between 25% and 40%.

15. The pneumatic tire according to claim 1, wherein the tread is made of rubber material that has a hardness A, at 0 degree Celsius, according to Japanese Industrial Standards of between 40 and 55.

16. The pneumatic tire according to claim 1, wherein each of the fourth grooves is parallel to the adjacent fifth grooves.

17. The pneumatic tire according to claim 1, where all of the fourth grooves and all of the fifth grooves extend in the same direction.

18. The pneumatic tire according to claim 1, wherein the fourth grooves on one side of the first row of blocks extend in directions parallel to the fourth grooves on the other side of the first row of blocks.

19. The pneumatic tire according to claim 1, wherein said outermost main grooves extend parallel to said second grooves.

20. The pneumatic tire according to claim 1, wherein when the pneumatic tire is rimed into a proper rim, inflated with a proper pressure, and loaded with a proper load, the fourth grooves are closed in a ground contact area, the fifth grooves are open in the ground contact area, and the sixth grooves are open in a ground contract area.

21. The pneumatic tire according to claim 1, wherein:
the fourth grooves on one side of the first row of blocks each extend only in a single direction along the full length thereof,
the fourth grooves on the other side of the first row of blocks each extend only in a single direction along the full length thereof, and
the single direction of each of the fourth grooves on one side is parallel to the single direction of each of the fourth grooves on the other side.

22. The pneumatic tire according to claim 1, wherein said second blocks comprise:
first sets each comprising a pair of adjacent second blocks separated by one of said third grooves, where said adjacent second blocks of each of said first sets each have the same first circumferential pitch, but have different circumferential lengths; and
second sets each comprising a pair of adjacent second blocks separated by one of said third grooves, where said adjacent second blocks of each of said second sets have the same second circumferential pitch, but have different circumferential lengths, and
wherein said second circumferential pitch is different than said first circumferential pitch.

23. A mold for a pneumatic tire, wherein the mold has a tread molding surface that can mold the tread of the pneumatic tire comprising:
a first row of blocks arranged in a substantially central region of a tread of the pneumatic tire, wherein the first row of blocks includes a plurality of first blocks;
a plurality of first grooves, wherein each said first groove is arranged between two adjacent first blocks;
a plurality of second rows of blocks each including a plurality of second blocks, wherein each said second row of blocks is arranged on either side of the first row of blocks;
a plurality of second grooves, wherein each said second groove is arranged between the first row of blocks and each of the second rows of blocks;
a plurality of third grooves, wherein each said third groove is arranged between two adjacent second blocks, the third grooves including a plurality of fourth grooves and a plurality of fifth grooves, with each said fourth groove being narrower than each said fifth groove, and said fourth groove and said fifth groove being arranged alternately along a circumference of the pneumatic tire;
a plurality of third rows of blocks, each including a plurality of third blocks, wherein each said third row of blocks is arranged on an outer side of the second row of blocks in the direction of the width of the pneumatic tire;
a plurality of sixth grooves, wherein each of said sixth grooves is arranged between two adjacent third blocks, wherein each of said sixth grooves is a ragged groove; and
a seventh groove, wherein said seventh groove is arranged between one of the second rows of blocks and one of the third row of blocks, wherein the seventh groove has a zig-zag shape,
wherein the fourth grooves, the fifth grooves and the sixth grooves are open at bending points of the zig-zag shape of the seventh groove,
wherein each of the second rows of blocks and each of the third rows of blocks are arranged on an inner side, with respect to the tire width direction, of an outermost main groove,
wherein adjacent ones of the fourth and fifth grooves extend in the same direction,
wherein a first block opposes at least three second blocks,
wherein an edge portion of one of said first blocks, on a second groove side thereof, opposes edge portions of at least three of said second blocks, on second groove sides thereof, and
wherein openings of an adjacent pair of the first grooves, on the second groove side thereof, are arranged offset to openings of an adjacent pair of the fourth groove and the fifth groove, on the second groove side thereof, in the tire circumferential direction.

24. The mold according to claim 23, wherein each of the fourth grooves is parallel to the adjacent fifth grooves.

25. The mold according to claim 23, where all of the fourth grooves and all of the fifth grooves extend in the same direction.

26. The mold according to claim 23, wherein the fourth grooves on one side of the first row of blocks extend in directions parallel to the fourth grooves on the other side of the first row of blocks.

27. The mold according to claim 23, wherein said outermost main grooves extend parallel to said second grooves.

* * * * *